United States Patent
Ikeda

(10) Patent No.: US 8,941,759 B2
(45) Date of Patent: Jan. 27, 2015

(54) INTERCHANGEABLE LENS AND DIGITAL CAMERA INCLUDING CONTROLLER FOR STOPPING ZOOM LENS AT ONE OF DISCRETE PREDETERMINED STOP POSITIONS

(75) Inventor: Takahiro Ikeda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 38 days.

(21) Appl. No.: 13/818,707

(22) PCT Filed: Aug. 24, 2011

(86) PCT No.: PCT/JP2011/004702
§ 371 (c)(1),
(2), (4) Date: Feb. 25, 2013

(87) PCT Pub. No.: WO2012/131794
PCT Pub. Date: Oct. 4, 2012

(65) Prior Publication Data
US 2013/0148008 A1    Jun. 13, 2013

(30) Foreign Application Priority Data

Mar. 29, 2011   (JP) .................. 2011-071640

(51) Int. Cl.
*H04N 5/262*     (2006.01)
*G03B 17/14*     (2006.01)
(Continued)

(52) U.S. Cl.
CPC *G03B 17/14* (2013.01); *G02B 7/04* (2013.01); *H04N 5/2254* (2013.01); *G02B 7/102* (2013.01); *G03B 2205/0046* (2013.01); *G03B 2206/00* (2013.01)

USPC .................................. 348/240.1; 348/240.99

(58) Field of Classification Search
USPC ............................. 348/240.99, 335
See application file for complete search history.

(56) References Cited

U.S. PATENT DOCUMENTS

| | | | |
|---|---|---|---|
| 5,790,901 | A | 8/1998 | Nakayama et al. |
| 6,809,884 | B2 | 10/2004 | Nomura et al. |

(Continued)

FOREIGN PATENT DOCUMENTS

| | | |
|---|---|---|
| JP | 2-068507 | 3/1993 |
| JP | 8-094907 | 4/1996 |

(Continued)

OTHER PUBLICATIONS

Translation of the International Preliminary Report on Patentability (PCT/IB/338) mailed on Oct. 10, 2013 with PCT/IB/373 & PCT/ISA/237 for corresponding application PCT/JP2011/004702.
International Search Report of PCT Application No. PCT/JP2011/004702 dated Nov. 15, 2011.

*Primary Examiner* — Tuan Ho
*Assistant Examiner* — Selam Gebriel

(57) ABSTRACT

An interchangeable lens includes a zoom lens, a driver configured to drive the zoom lens, an operation unit configured to receive a user's operation for changing a magnification of the zoom lens, and a controller configured to control the driver according to the operation of the operation unit. The controller controls the driver in either one of a first operation mode for enabling the zoom lens to stop at an arbitrary position according to the operation of the operation unit and a second operation mode for enabling the zoom lens to stop at one of discrete predetermined stop positions according to the operation of the operation unit.

7 Claims, 9 Drawing Sheets

(51) Int. Cl.
*G02B 7/04* (2006.01)
*H04N 5/225* (2006.01)
*G02B 7/10* (2006.01)

(56) References Cited

U.S. PATENT DOCUMENTS

2009/0244325 A1* 10/2009 Honjo et al. ............ 348/231.99
2010/0231782 A1 9/2010 Okamoto et al.
2010/0232775 A1 9/2010 Okamoto et al.
2010/0232779 A1 9/2010 Okamoto et al.
2010/0238321 A1 9/2010 Honjo et al.

FOREIGN PATENT DOCUMENTS

| | | |
|---|---|---|
| JP | 2002-277718 | 9/2002 |
| JP | 2002-287202 | 10/2002 |
| JP | 2003-174580 | 6/2003 |
| JP | 2009-169065 | 7/2009 |
| JP | 2010-271696 | 12/2010 |
| JP | 2010-281846 | 12/2010 |
| JP | 2011-039177 | 2/2011 |
| WO | 2009/041063 | 4/2009 |

* cited by examiner

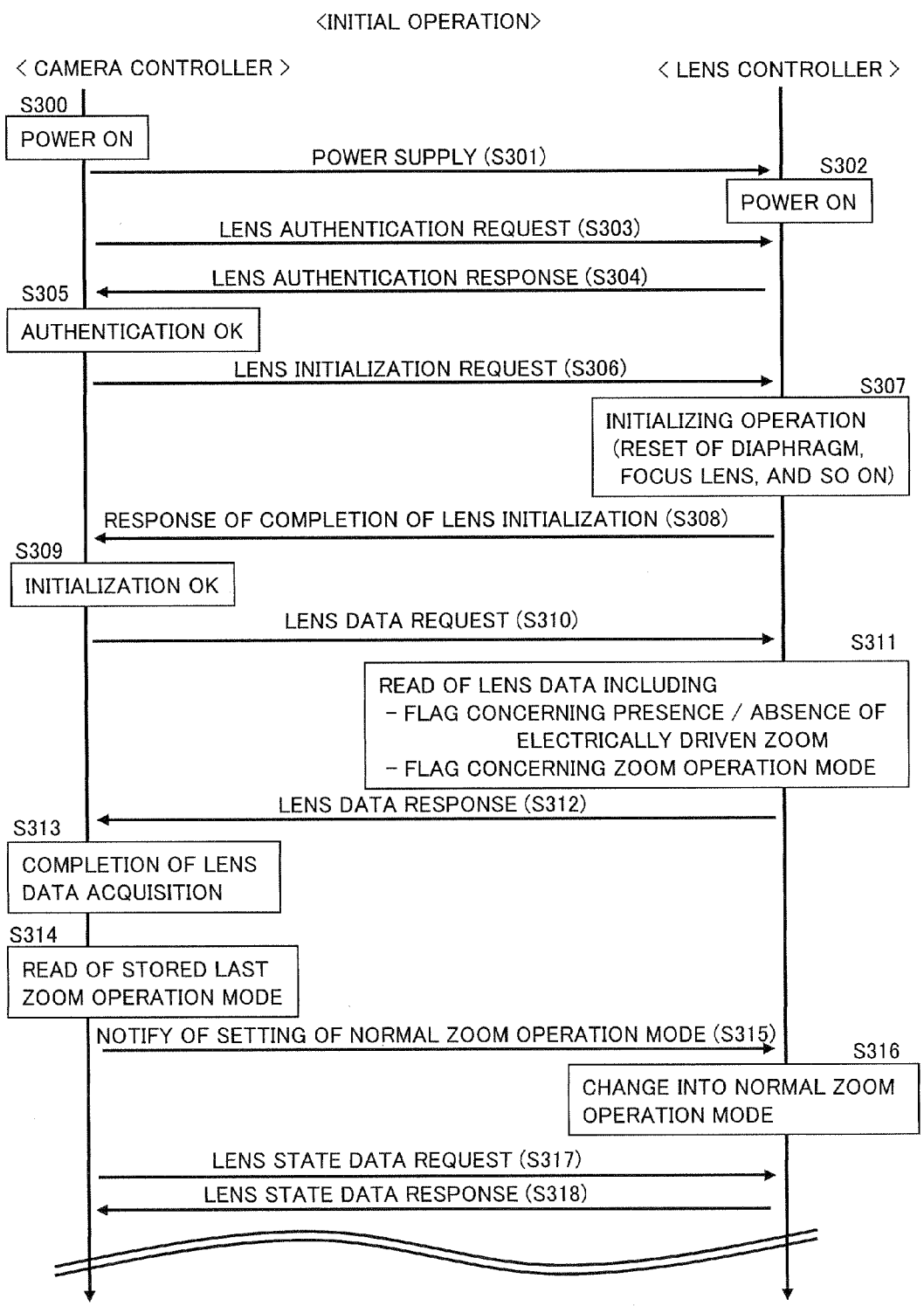

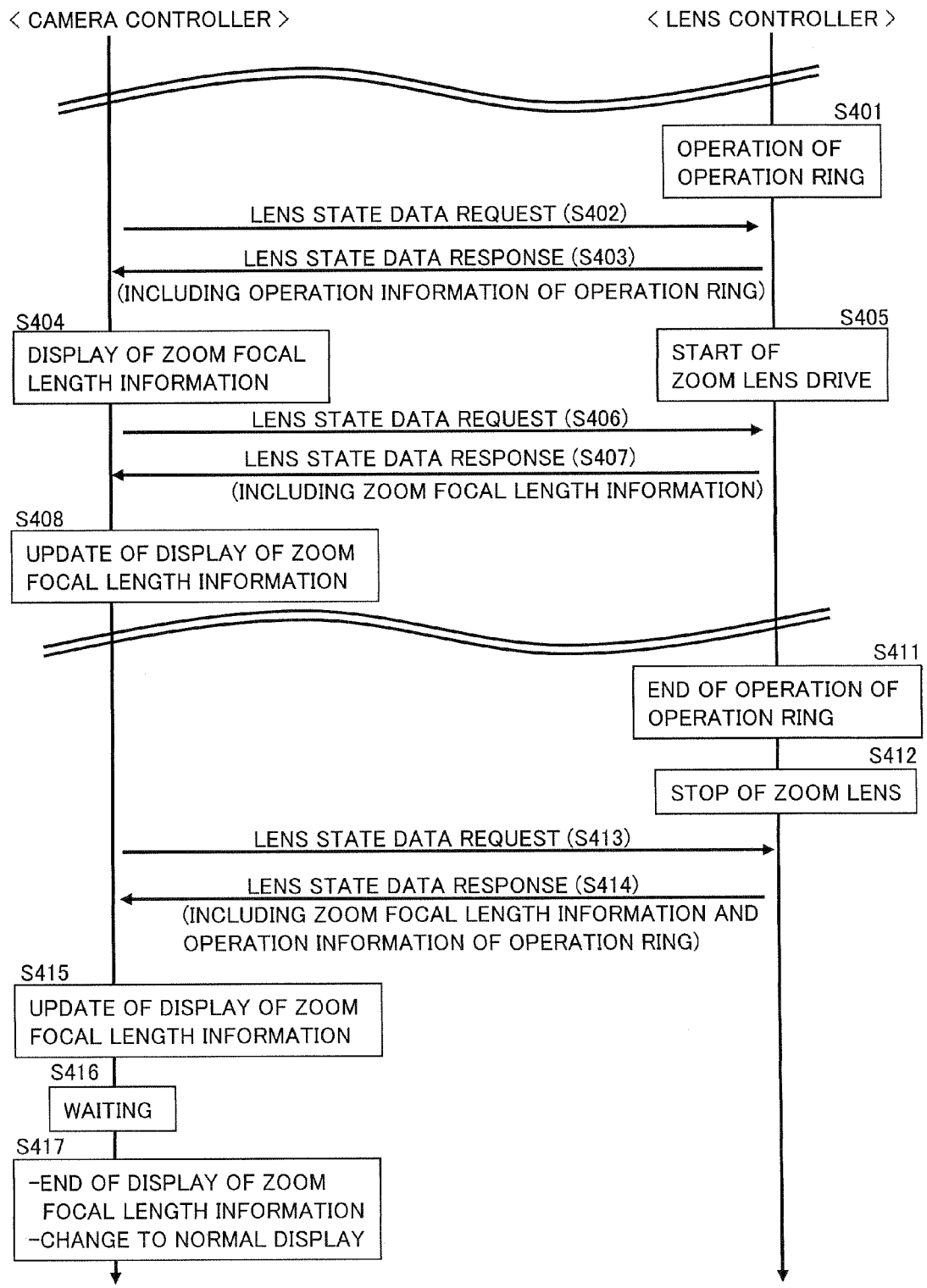

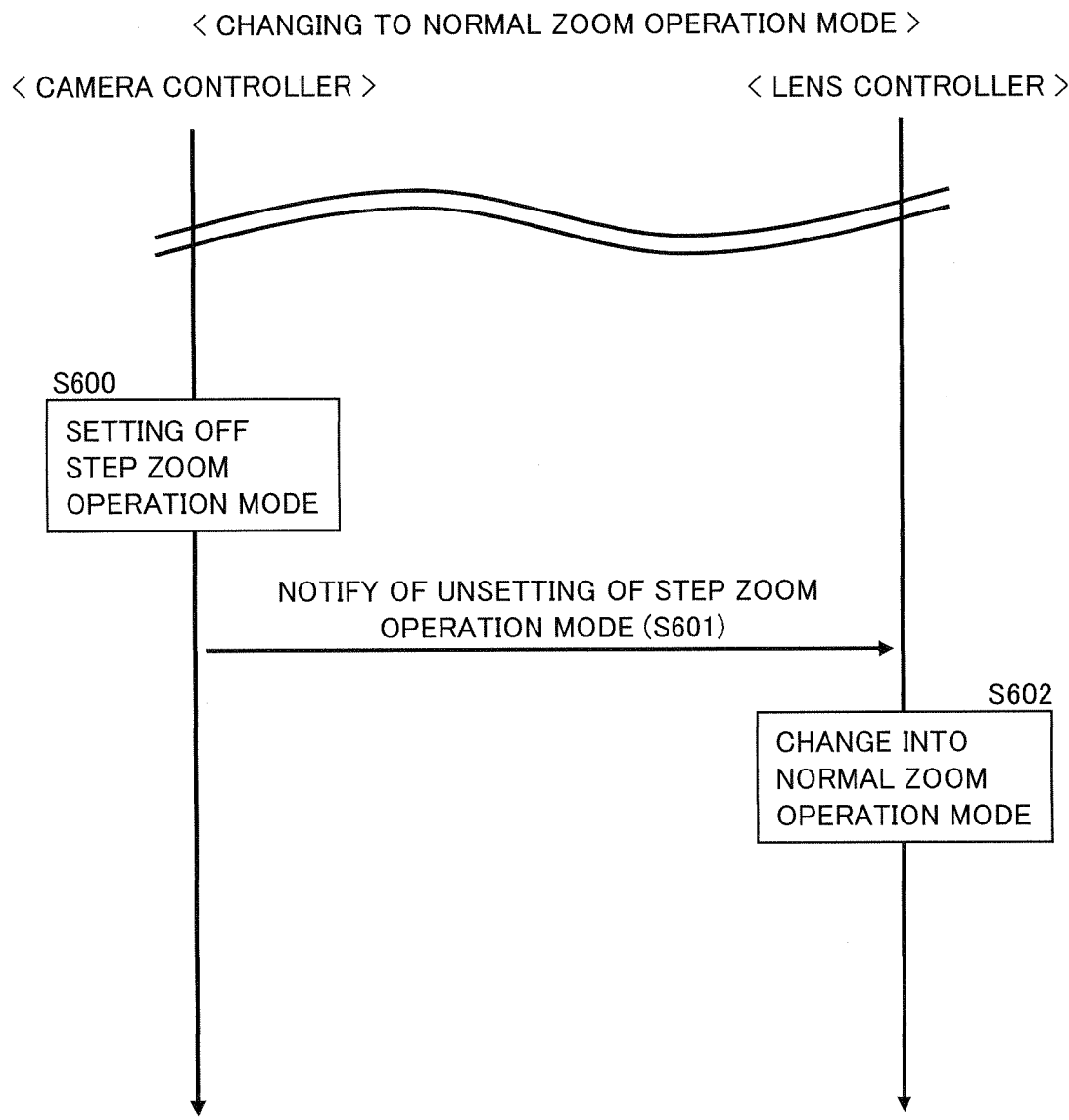

INTERCHANGEABLE LENS AND DIGITAL CAMERA INCLUDING CONTROLLER FOR STOPPING ZOOM LENS AT ONE OF DISCRETE PREDETERMINED STOP POSITIONS

TECHNICAL FIELD

The present invention relates to an interchangeable lens having an electrically driven zoom lens, and a camera body to which the interchangeable lens is mountable.

BACKGROUND ART

A conventional interchangeable lens unit adopts a mechanism that mechanically drives an optical system such as a focus lens and a zoom lens. Against this, in recent years, an interchangeable lens unit is suggested that drives an optical system with an electrically driven actuator such as a motor (for example, see Patent Document 1).

On the other hand, some of cameras built-in lens are mounted with a step zoom function for being capable of setting a predetermined zoom focal length in order to enable photographing with predetermined variable magnification (for example, see Patent Document 2).

PRIOR ART DOCUMENT

Patent Document

Patent Document 1: WO 2009/041063 A
Patent Document 2: Japanese Patent Application Laid-Open No. H02-068507

SUMMARY OF INVENTION

Problem to be Solved by the Invention

In a lens interchangeable-type camera, when the variable maynification of zoom is set to a specific value, a user checks a view angle via a viewfinder or the like and simultaneously sets the variable magnification of zoom through his/her experience and feel or sets the variable magnification of zoom according to a guidepost of a focal length described on a zoom driving ring. In this case, it takes a time to set again the same variable magnification, or accuracy is deteriorated. Therefore, setting of the variable magnification is not usability for the user in the conventional lens interchangeable-type camera.

The present invention is devised in view of the above problem, and its object is to provide an interchangeable lens that is capable of setting the variable magnification with good usability for a user of a camera, and a camera body to which the interchangeable lens can be mounted.

Means for Solving the Problem

In a first aspect of the present invention, an interchangeable lens mountable to a camera body is provided. The interchangeable lens includes a zoom lens, a driver configured to drive the zoom lens, an operation unit configured to receive a user's operation for changing a magnification of the zoom lens, and a controller configured to control the driver according to the operation to the operation unit. The controller controls the driver in either one of a first operation mode for enabling the zoom lens to stop at an arbitrary position according to the operation of the operation unit and a second operation mode for enabling the zoom lens to stop at one of discrete predetermined stop positions according to the operation of the operation unit.

In a second aspect of the present invention, there is provided a camera body to which an interchangeable lens having a zoom lens stoppable at one of discrete predetermined stop positions is mountable. The camera body includes a storage unit configured to store information about the predetermined stop positions regarding the at least one interchangeable lens, a controller configured to obtain characteristic information about the interchangeable lens from the mounted interchangeable lens and obtain the information about the predetermined stop position regarding the mounted interchangeable lens out of the information stored in the storage unit based on the obtained characteristic information, and a communication unit configured to transmit the obtained information about the predetermined stop position to the interchangeable lens.

Effect of the Invention

According to the present invention, variable magnification can be set in both a continuous zoom operation (a first zoom operation mode) and a step (discrete) zoom operation (a second zoom operation mode). In the step zoom operation, the zoom lens can be quickly and accurately stopped at a predetermined intended position. Therefore, the interchangeable lens that is capable of the setting variable magnification with good usability for a user, and the camera body to which the interchangeable lens is mountable can be realized.

BRIEF DESCRIPTION OF DRAWINGS

FIG. 5A is a diagram illustrating a display example in a normal state, FIG. 5B is a diagram illustrating a display example in a normal zoom operation mode, and FIG. 5C is a diagram illustrating a display example in a step zoom operation mode.

FIG. 6 is a flowchart illustrating an initial operation of the digital camera according to the first embodiment of the present invention.

FIG. 7 is a flowchart illustrating a zoom operation of the digital camera in the normal zoom operation mode according to the first embodiment of the present invention.

FIG. 9 is a flowchart illustrating an operation of the digital camera for switching from the step zoom operation mode to the normal zoom operation mode according to the first embodiment of the present invention.

MODES FOR CARRYING OUT THE INVENTION

Embodiments of the present invention will be described below with reference to the accompanying drawings.

First Embodiment

A digital camera according to the first embodiment of the present invention electrically drives a zoom lens, and includes an interchangeable lens that can perform a continuous zoom operation and a step (discrete) zoom operation. In the step zoom operation, the digital camera quickly and accurately stops the zoom lens in a predetermined intended position according to a user's operation of an operation ring. This enables setting of variable magnification with good usability for a user.

1. Configuration 1-1. Entire Configuration of Digital Camera

An outline of a Configuration of the digital camera according to the first embodiment will be described.

Figure 1:
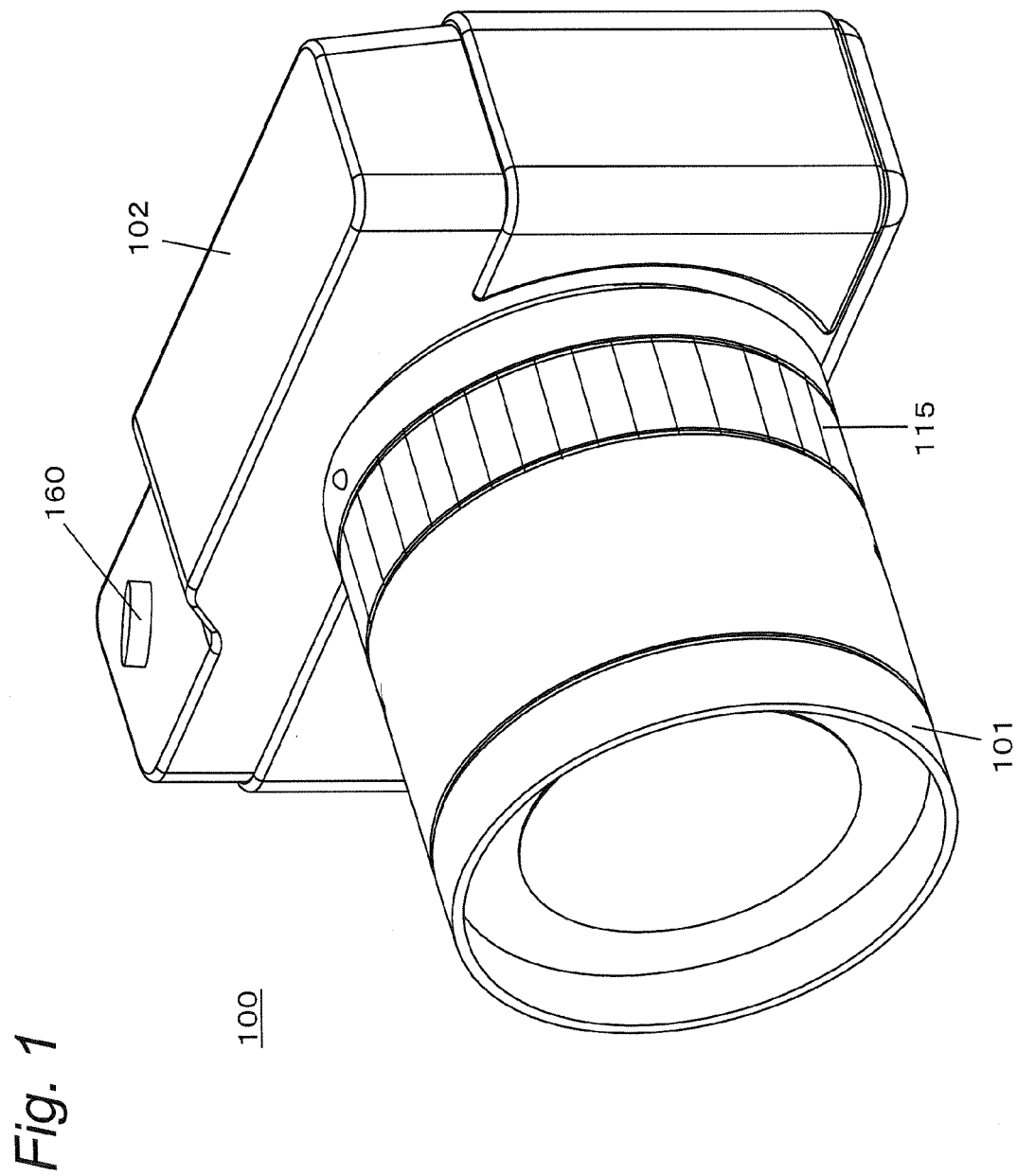
FIG. 1 is an exterior view illustrating a digital camera according to a first embodiment of the present invention.

FIG. 1 is an exterior view illustrating the digital camera according to the first embodiment. As shown in FIG. 1, a digital camera 100 includes an electromotive interchangeable lens 101, and a camera body 102 to which the electromotive interchangeable lens 101 can be mounted. The electromotive interchangeable lens 101 has an operation ring 115. When the operation ring 115 is operated by the user, the operation ring 115 controls the zoom lens of the electromotive interchangeable lens 101. The camera body 102 has a release button 160. When the camera body 102 receives an operation of the release button 160 from the user, the camera body 102 notifies the mounted electromotive interchangeable lens 101 of a control signal so that an auto-focus operation is performed, or captures a subject image formed via the electromotive interchangeable lens 101.

Figure 2:
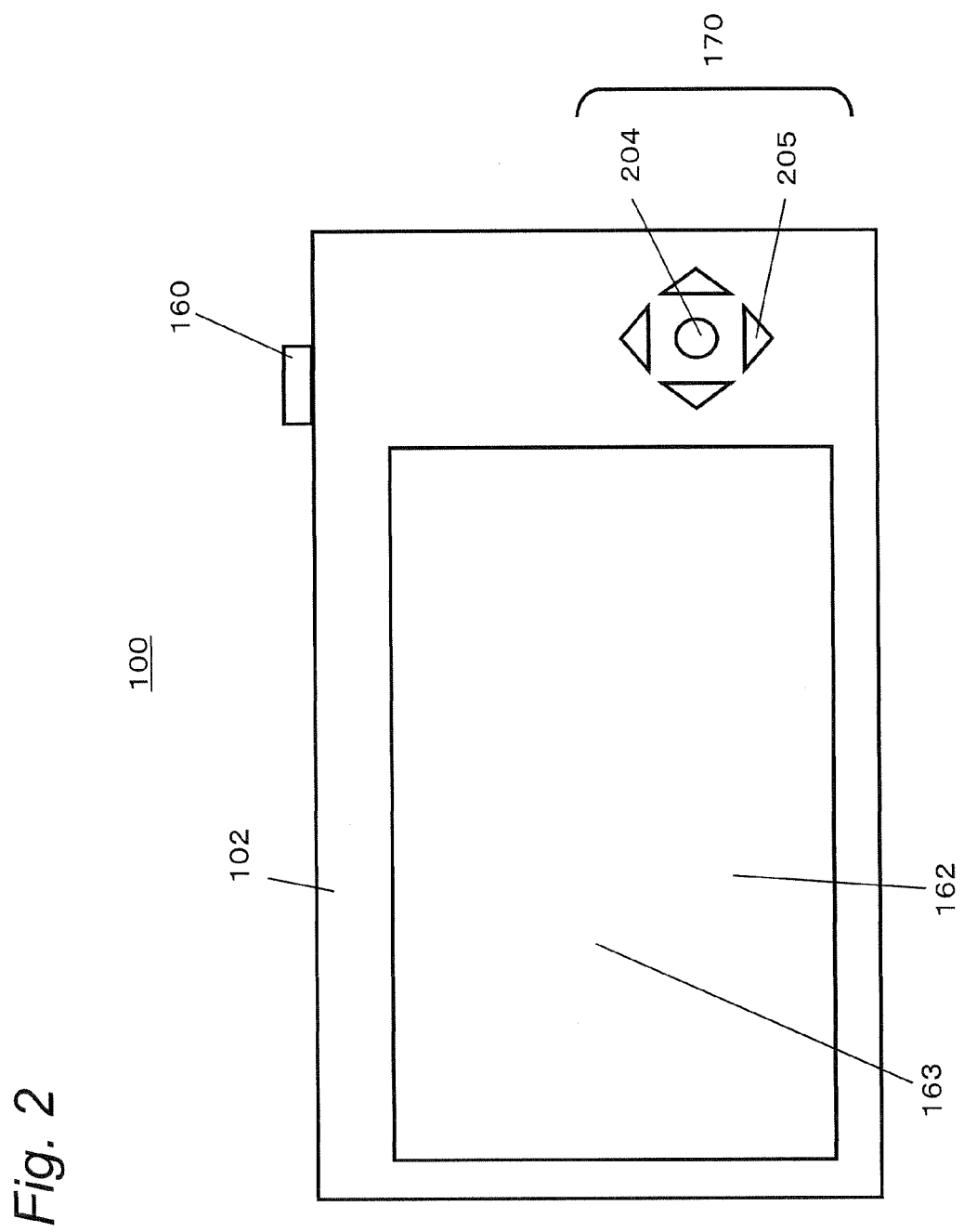
FIG. 2 is a rear view illustrating the digital camera according to the first embodiment of the present invention.

FIG. 2 is a rear view illustrating the camera body 102 of the digital camera 100. The camera body 102 is provided with a liquid crystal monitor 163, a touch panel 162, a camera side operation unit 170 (including a center button 204 and a cross button 205), and the like, on its rear section. The camera body 102 receives operations of the touch panel 162 and the camera side operation unit 170 from the user, and performs various controls according to the received operation contents.

Figure 3:
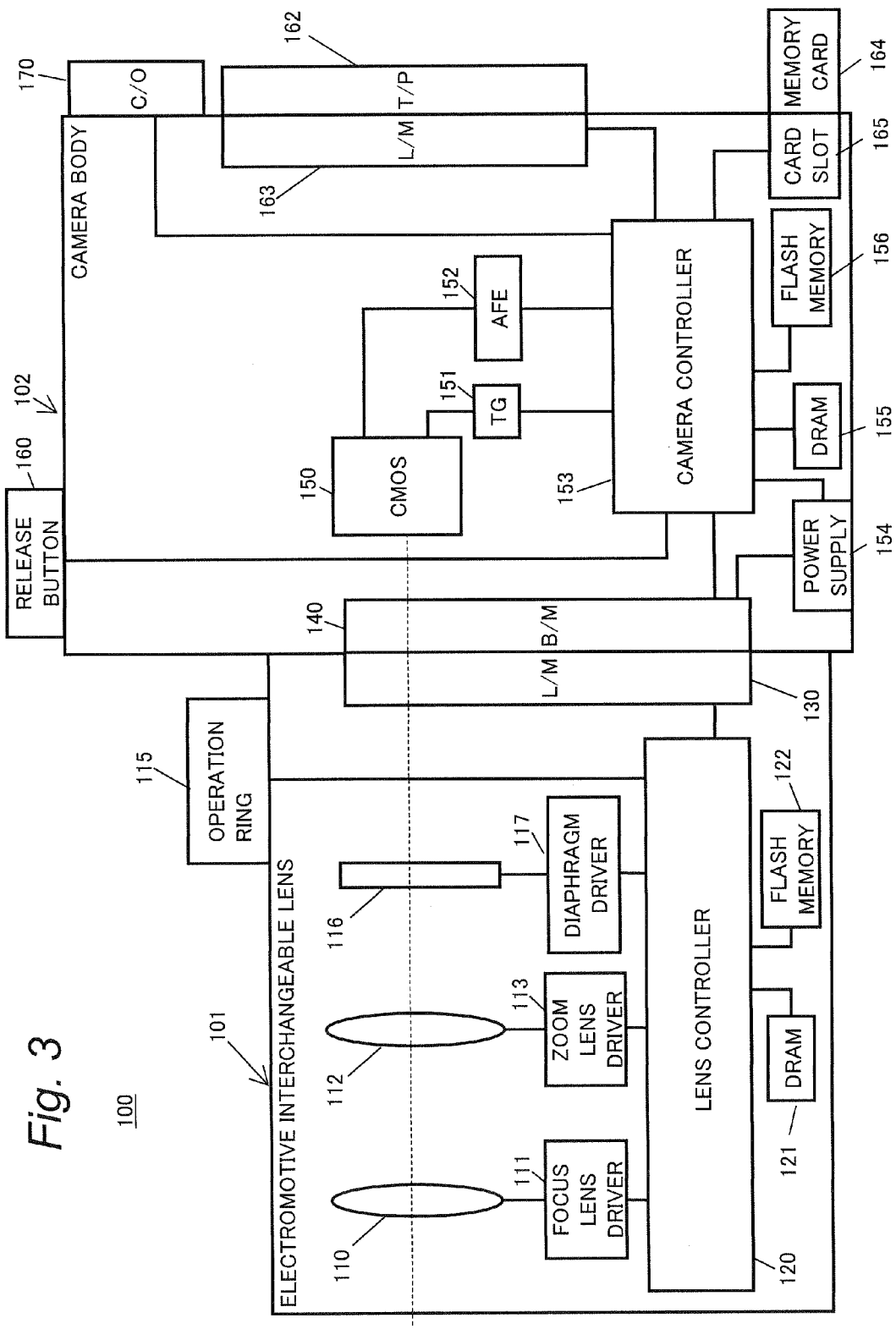
FIG. 3 is a diagram illustrating an electrical configuration of the digital camera according to the first embodiment of the present invention.

FIG. 3 is a diagram illustrating an electrical configuration of the digital camera 100 (the electromotive interchangeable lens 101 and the camera body 102). The electromotive interchangeable lens 101 has an optical system including a lens controller 120, a lens mount 130, a focus lens 110, and a zoom lens 112, a focus lens driver 111, a zoom lens driver 113, a diaphragm 116, a diaphragm driver 117, the operation ring 115, a DRAM 121, and a flash memory 122. The camera body 102 has a camera controller 153, a body mount 140, a CMOS image sensor 150, a timing generator (TG) 151, an analog front end (AFE) 152, the liquid crystal monitor 163, the touch panel 162, the release button 160, the camera side operation unit 170, a power supply 154, a DRAM 155, a flash memory 156, a card slot 165, and a memory card 164.

1-2. Configuration of Electromotive Interchangeable Lens

Respective units of the electromotive interchangeable lens 101 will be described.

The lens controller 120 controls an entire operation of the electromotive interchangeable lens 101. The lens controller 120 receives an operation to the operation ring 115 from the user, and controls the zoom lens driver 113 to drive the zoom lens 112. The lens controller 120 is connected to the DRAM 121 and the flash memory 122, and can write and read information into and from these memories as needed. Further, the lens controller 120 can communicate with the camera controller 153 via the lens mount 130. The lens controller 120 may be constituted by a hard-wired electronic circuit, or may be constituted by a microcomputer with a program or the like.

The lens mount 130 is a connecting member for mechanically and electrically connecting the electromotive interchangeable lens 101 and the camera body 102 in combination with the body mount 140 provided to the camera body 102. When the electromotive interchangeable lens 101 is mechanically and electrically connected to the camera body 102, the lens controller 120 and the camera controller 153 are communicable with each other.

The DRAM 121 is used as a work memory when the lens controller 120 performs various controls. Further, the flash memory 122 stores programs, parameters, lens data, and so on to be used when the lens controller 120 performs various controls.

The focus lens 110 is a lens for changing a focus state of a subject image that is incident on the optical system of the electromotive interchangeable lens 101 and is formed on the CMOS image sensor 150. A lens configuration of the focus lens 110 may be any number of lenses or any number of lens groups. The focus lens driver 111 drives the focus lens 110 so that the focus lens 110 advances and retreats along an optical axis of the optical system based on the control signal notified by the lens controller 120. The focus lens driver 111 can be implemented with, for example, a stepping motor, a DC motor, an ultrasonic motor, or so on.

The zoom lens 112 is a lens for changing a magnification of a subject image that is formed by the optical system of the electromotive interchangeable lens 101. A lens configuration of the zoom lens 112 may be any number of lenses or any number of lens groups. The zoom lens driver 113 electrically drives the zoom lens 112 to advance and to retreat along the optical axes of the optical system based on control signal notified by the lens controller 120. The zoom lens driver 113 can be implemented with, for example, the stepping motor, the DC motor, the ultrasonic motor, or so on.

The diaphragm 116 includes a plurality of mechanical blades which can be opened/closed. The diaphragm 116 is a member for adjusting an amount of light incident to the optical system of the electromotive interchangeable lens 101. The diaphragm driver 117 changes the open/close state of the mechanical blades of the diaphragm 116 based on a control signal notified from the lens controller 120. The diaphragm driver 117 can be implemented with, for example, a stepping motor, a DC motor, an ultrasonic motor, or the like.

The operation ring 115 is an operation member provided to an outer surface of the electromotive interchangeable lens 101. The operation ring 115 is configured to rotate relatively with respect to the electromotive interchangeable lens 101. A rotating position and a rotating speed of the operation ring 115 are detected by a detector (not shown) and are notified to the lens controller 120. The lens controller 120 supplies a driving control signal to the zoom lens driver 113 based on the notified rotating position and rotating speed of the operation ring 115. That is to say, the lens controller 120 supplies the driving control signal to the zoom lens driver 113 so that the zoom lens 112 is driven based on the user's operation to the operation ring 115.

1-3. Configuration of Camera Body

Respective units of the camera body 102 will be described.

The camera controller 153 controls the operation of the entire digital camera 100 including the CMOS image sensor 150 according to instructions from the release button 160 and the camera side operation unit 170. The camera controller 153 notifies the timing generator (TG) 151 of a vertical synchronizing signal. In parallel with this, the camera controller 153 generates an exposure synchronizing signal based on the vertical synchronizing signal. The camera controller 153 periodically notifies the lens controller 120 of the generated exposure synchronizing signal via the body mount 140 and the lens mount 130 in a repeating manner. The camera controller 153 is connected to the DRAM 155 and the flash memory 156 to write/read information into/from these memories as necessary. The camera controller 153 may be configured by a hard-wired electronic circuit, a microcomputer with a program, or the like.

The DRAM 155 is used as a work memory when the camera controller 153 performs various controls. Further, the flash memory 156 stores programs, parameters, and the like which are used when the camera controller 153 performs various controls.

The CMOS image sensor 150 captures a subject image incident via the electromotive interchangeable lens 101 to generate image information. The generated image information is converted from data with analog format into data with digital format by the AFE 152. The image information digitalized by the AFE 152 is subject to various image processes in the camera controller 153. Examples of the various image processes described herein are a gamma correcting process, a white balance correcting process, a scratch correcting process, an YC converting process, an electronic zoom process and a JPEG compressing process, but not limited to them. Instead of the CMOS image sensor 150, for example, another imaging device such as an NMOS image sensor or a CCD image sensor may be used.

The CMOS image sensor 150 operates at timing of control by the TG 151. The operations of the CMOS image sensor 150 controlled by the TG 151 include a still image capturing operation, a through image capturing operation, a data transfer operation and an electronic shutter operation. A through image is mainly a moving image, and is displayed on the liquid crystal monitor 163 in order that the user determines a composition for capturing a still image.

The liquid crystal monitor 163 is arranged on the rear surface of the camera body 102, and displays an image indicated by image information for display processed by the camera controller 153. The liquid crystal monitor 163 can selectively display moving images and still images. Further, the liquid crystal monitor 163 can display images, also setting conditions of the entire digital camera 100 and the like. This embodiment describes the liquid crystal monitor 163 as one example of a display means, but the present invention is not limited to this. For example, a display means such as an organic EL display may be used.

The touch panel 162 is provided to the surface of the liquid crystal monitor 163, and generates information about an electrode position on the touch panel touched by the user. The touch panel 162 calculates a position coordinate on the touch panel touched by the user based on the information about the electrode position to notify the camera controller 153 of the position coordinate.

The body mount 140 is a connecting member for mechanically and electrically connecting the electromotive interchangeable lens 101 and the camera body 102 to each other in combination with the lens mount 130 of the electromotive interchangeable lens 101. When the electromotive interchangeable lens 101 and the camera body 102 are mechanically and electrically connected to each other, the lens controller 120 and the camera controller 153 becomes in a state capable of communicating. The body mount 140 transmits the exposure synchronizing signal and other control signals received from the camera controller 153 to the lens controller 120 via the lens mount 130. Further, the body mount 140 transmits signals received from the lens controller 120 to the camera controller 153 via the lens mount 130.

The power supply 154 supplies a power for driving the digital camera 100. The power supply 154 may be, for example, a dry battery or a rechargeable battery. Further, the power supply 154 may supply a power supplied from the outside through a power cord to the digital camera 100. When the power supply 154 is turned ON, the camera controller 153 supplies a power throughout the camera body 102, and simultaneously supplies a power through the electromotive interchangeable lens 101 via the body mount 140 and the lens mount 130. The lens controller 120 supplies a power throughout the electromotive interchangeable lens 101.

The card slot 165 is a connecting means to which the memory card 164 can be mounted. The card slot 165 can be electrically and mechanically connected to the memory card 164. The card slot 165 may have a function for controlling the memory card 164.

The memory card 164 is an external memory containing a storage means such as the flash memory. The memory card 164 can store data such as image information processed by the camera controller 153. Further, the memory card 164 can output the data such as image information stored therein. The image information output from the memory card 164 is processed by the camera controller 153, and is reproduced to be displayed on, for example, the liquid crystal monitor 163.

The release button 160 receives a user's operation. A two-stage operation including full press and half press operations is enabled on the release button 160. When the user performs the half-press operation on the release button 160, the camera controller 153 performs the auto-focus operation. Further, when the user performs the full-press operation on the release button 160, the camera controller 153 stores image information generated according to timing of the full-press operation into the memory card 164.

The camera side operation unit 170 is a general name of operating members including the center button 204 and the cross button 205 described above. The camera side operation unit 170 includes a switch for switching MF (manual focus)/AF (auto-focus). When the camera side operation unit 170 receives a user's operation, the camera controller 153 performs various controls according to operation instructing contents.

1-4. Zoom Operation Mode

Figure 4:
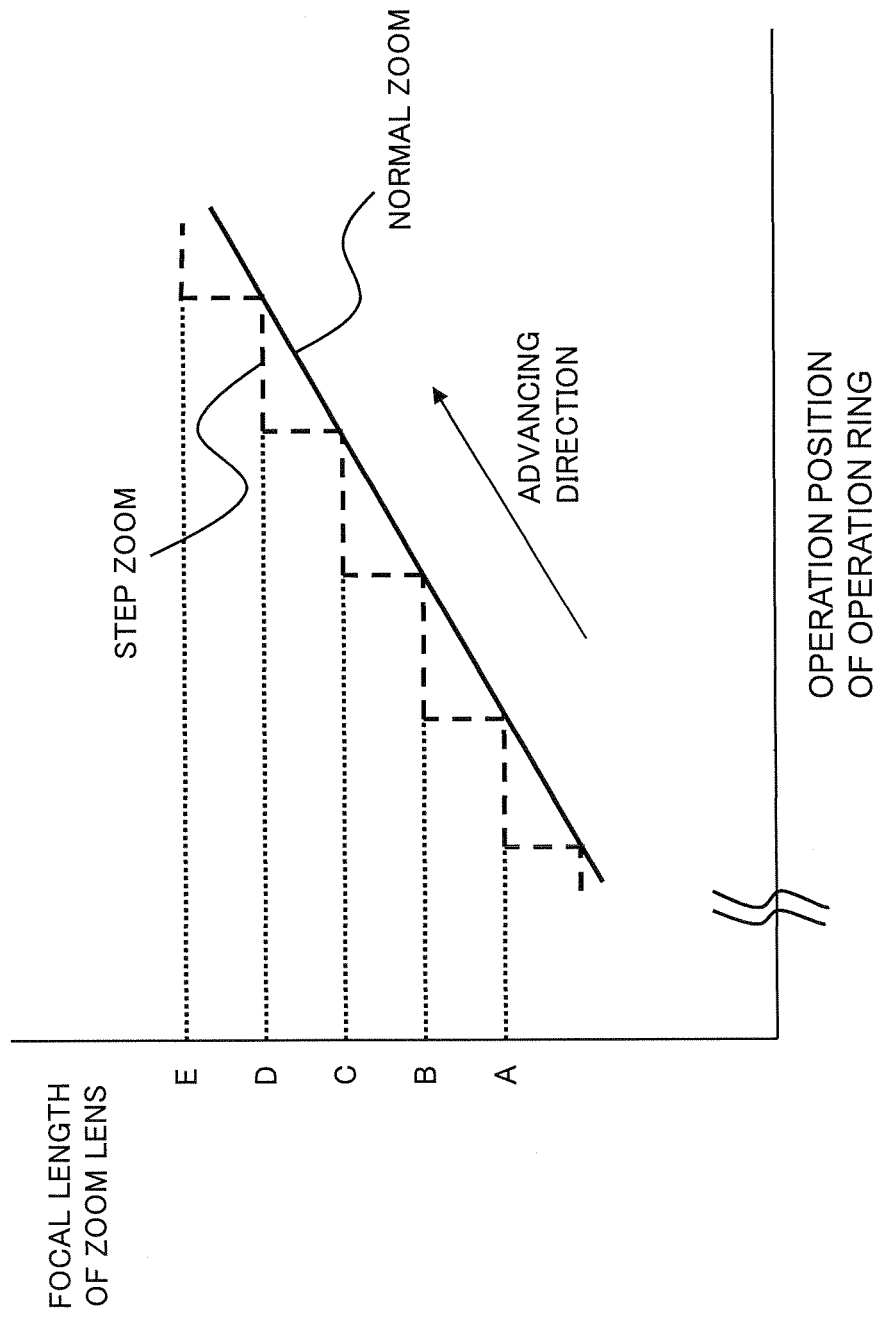
FIG. 4 is an image diagram illustrating a zoom operation mode according to the first embodiment of the present invention.

A zoom operation mode of the electromotive interchangeable lens 101 will be described. FIG. 4 is a diagram describing the zoom operation mode according to the present embodiment. The zoom operation mode of the present embodiment includes a normal zoom operation mode (first zoom operation mode) and a step zoom operation mode (second zoom operation mode). The normal zoom operation mode is a mode for moving the zoom lens 112 to a position (position that continuously changes) according to a user's operation to the operation ring 115 of the electromotive interchangeable lens 101 as indicated by a solid line of FIG. 4. The step zoom operation mode is a mode for moving the zoom lens 112 to one of discrete positions (A to E of FIG. 4) according to a user's operation to the operation ring 115 of the electromotive interchangeable lens 101 as indicated by a broken line of FIG. 4. In the step zoom operation mode, information about the stoppable discrete positions (A to E of FIG. 4) is stored in the flash memory 122 of the electromotive interchangeable lens 101 in advance.

In the normal zoom operation mode, just after the user stops the operation to the operation ring 115, the electromotive interchangeable lens 101 stops driving of the zoom lens 112. As a result, the zoom lens 112 can be stopped at a continuous position according to the operation to the operation ring 115. On the other hand, in the step zoom operation mode, when the user stops the operation to the operation ring 115, the electromotive interchangeable lens 101 drives the zoom lens 112 to a stop position in an advancing direction of the zoom lens 112 out of a predetermined stop position group that is the closest to the actual stop position of the zoom lens 112, and stops the driving. In this case, the zoom lens 112 can be stopped at one of discrete positions according to the operation to the operation ring 115. With the step zoom operation mode, the user can quickly, accurately and easily move the zoom lens 112 by a predetermined focal length, and thus it is more advantageous in this point compared to the normal zoom operation mode.

By operating the touch panel 162 on a menu screen displayed on the liquid crystal monitor 163 of the camera body 102, the user can set the zoom operation mode to either one of the normal zoom operation mode and the step zoom operation mode. Setting information about the zoom operation mode is stored in the flash memory 156 of the camera body 102, and is updated by the camera controller 153. In the present embodiment, the zoom operation mode is set to the normal zoom operation mode as a default value. When the user changes the zoom operation mode, the setting information about the changed zoom operation mode is stored in the flash memory 156 of the camera body 102 at every change. In the present embodiment, only one piece of the setting information about the zoom operation mode is stored in the flash memory 156 of the camera body 102 regardless of a type of interchangeable lens to be mounted. That is to say, "the normal zoom operation mode" of default is stored until the user changes the zoom operation mode, and after the user newly sets the zoom operation mode, the setting information indicating the zoom operation mode set by the user is stored.

Figure 5A:
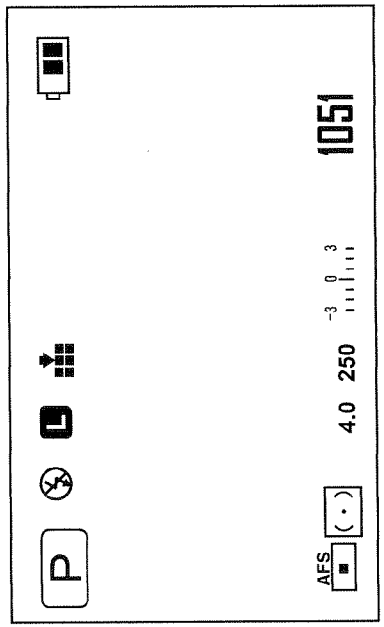
FIGS. 5A, 5B, and 5C are diagrams illustrating a display example of a display unit of a camera body according to the first embodiment of the present invention.
Figure 5B:
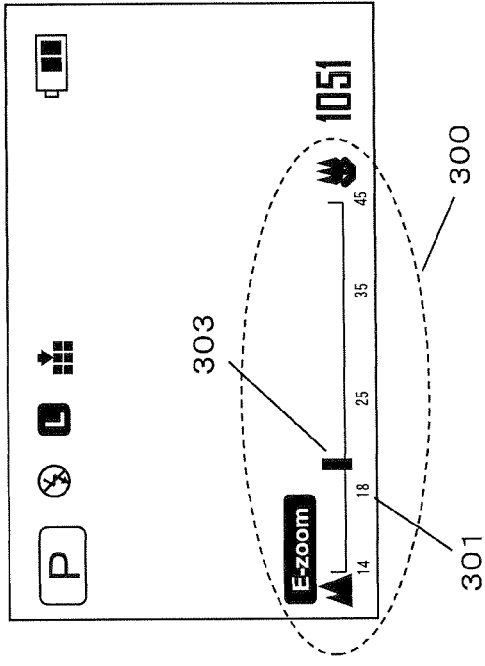
Figure 5C:
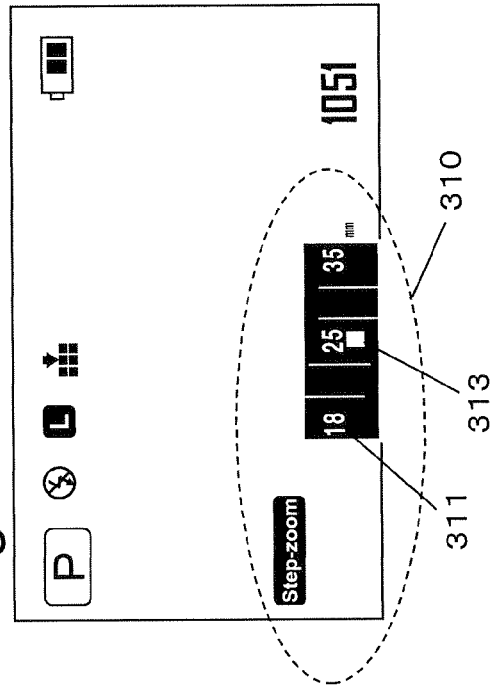

FIGS. 5A to 5C are diagrams illustrating display examples on the liquid crystal monitor 163 of the camera body 102. FIG. 5A is a diagram illustrating a normal display state of the liquid crystal monitor 163 of the camera body 102. That is to say, FIG. 5(a) illustrates display when the zoom lens 112 is not driven. When the user operates the operation ring 115 of the electromotive interchangeable lens 101, the lens controller 120 supplies a driving control signal to the zoom lens driver 113 to move the zoom lens 112, and simultaneously transmits information indicating that the operation ring 115 is operated to the camera body 102 via the lens mount 130. The camera body 102 receives the information indicating that the operation ring 115 of the electromotive interchangeable lens 101 is operated using the camera controller 153 via the body mount 140. The camera controller 153 changes the display of the liquid crystal monitor 163 from the display in FIG. 5A to the display in FIG. 5B or FIG. 5C according to the zoom operation mode of the lens.

FIG. 5B is a diagram illustrating the display example at a time of the normal zoom operation mode (the first zoom operation mode). In FIG. 5B, a display 300 of zoom focal length information including a focal length scale 301 and a guidepost 303 representing a current zoom focal length is displayed so that the user can recognize a magnification of electrically driven zoom that is currently set. In the normal zoom operation mode, when the zoom lens 112 of the electromotive interchangeable lens 101 is driven and when detecting that the operation to the operation ring 115 is stopped, the lens controller 120 immediately stops supply of a control signal to the zoom lens driver 113. As a result, the user of the digital camera 100 can set the variable magnification of the zoom lens 112 to an intended variable magnification by the operation to the operation ring 115. In the example of FIG. 5B, an intended focal length (for example, 19 millimeters) out of 14 millimeters to 45 millimeters can be set.

On the other hand, FIG. 5C is the diagram illustrating the display example at a time of the step zoom operation mode (the second zoom operation mode). In FIG. 5C, the display 310 of the zoom focal length information including the focal length scale 311 and the guidepost 313 representing the current zoom focal length is displayed so that the user can recognize the currently set magnification of the electrically driven zoom. In the step zoom operation mode, when the lens controller 120 detects that the operation to the operation ring 115 is stopped during the driving of the zoom lens 112 of the electromotive interchangeable lens 101, the lens controller 120 determines a stop position out of the predetermined stop position group of the zoom lens in the advancing direction of the zoom lens 112 that is the closest to the actual stop position of the zoom lens 112. The lens controller 120 drives the zoom lens 112 to the determined stop position, and then stops the supply of a control signal to the zoom lens driver 113. As a result, the user of the digital camera can set one focal length out of a plurality of predetermined focal lengths (variable magnification). In the example of FIG. 5C, the focal length (the variable magnification) can be set to either one of 14 millimeters, 18 millimeters, 25 millimeters, 35 millimeters, and 45 millimeters (for example, 25 millimeters).

2. Operation 2-1. Outline

An outline of the operation of the digital camera 100 according to the first embodiment will be described. When the user operates a power switch (not shown) of the camera body 102 to turn ON the power supply 154 of the camera body 102 in a state that the electromotive interchangeable lens 101 is mounted to the camera body 102, a power is supplied and simultaneously various initial settings are carried out.

The camera body 102 transmits the information about the zoom operation mode to the electromotive interchangeable lens 101 based on the setting information about the zoom operation mode stored in the flash memory 156. The setting information indicating the zoom operation mode set in the camera body 102 at a previous power-OFF time is stored in the flash memory 156. The electromotive interchangeable lens 101 mounted to the camera body 102 set the zoom operation mode to either one of the normal zoom operation mode and the step zoom operation mode according to the contents of the setting information obtained from the camera body 102.

The user of the digital camera 100 can set the zoom operation mode of the electromotive interchangeable lens 101 by means of the operation on the camera body 102. When the zoom operation mode is switched by the user's operation on the camera body 102, the camera body 102 transmits switching information about the zoom operation mode to the electromotive interchangeable lens 101. The electromotive interchangeable lens 101 switches the zoom operation mode according to the information from the camera body 102.

The initial operations and the zoom operations of the electromotive interchangeable lens 101 and the camera body 102 will be described in detail below.

2-2. Initial Operation Upon Attachment of Electromotive Interchangeable Lens to Camera Body The initial operation performed at the time when the electromotive interchangeable lens 101 is mounted to the camera body 102 will be described with reference to FIG. 6. FIG. 6 is a diagram illustrating a sequence of the initial operation for the digital camera 100 of preparing for the capturing.

When the user turns ON the power supply 154 of the camera body 102 (S300) with the electromotive interchangeable lens 101 being mounted to the camera body 102, the power supply 154 supplies a power to the electromotive interchangeable lens 101 via the body mount 140 and the lens mount 130 (S301). As a result, the power is supplied to the respective units of the electromotive interchangeable lens 101 (S302).

Next, the camera controller 153 requests authentication information about the electromotive interchangeable lens 101 from the lens controller 120 (S303). The authentication information about the electromotive interchangeable lens 101 includes information about a type of a mounted interchangeable lens (for example, the electromotive interchangeable lens 101 is mounted or not), and information about whether an accessory is mounted to the electromotive interchangeable lens 101. The lens controller 120 responds to a lens authentication request from the camera controller 153 (S304). As a result, the camera controller 153 completes the lens authentication, and can grasp whether the electromotive interchangeable lens 101 is mounted to the camera body 102 or whether the accessory such as a teleconverter lens and a wide converter lens is mounted to the electromotive interchangeable lens 101 (S305).

Next, the camera controller 153 requests the lens controller 120 to perform an initializing operation (S306). In response to this, the lens controller 120 performs the initializing operation such as resetting of the focus lens 110, resetting of the zoom lens 112 and resetting of the diaphragm 116 (S307). Thereafter, the lens controller 120 returns the completion of the lens initializing operation to the camera controller 153 (S308). As a result, the camera controller 153 can grasp that the electromotive interchangeable lens 101 has been initialized (S309).

Next, the camera controller 153 requests lens data from the lens controller 120 (S310). The lens data is stored in the flash memory 122 of the electromotive interchangeable lens 101. Receiving the request of the lens data from the camera controller 153, the lens controller 120 reads out the lens data from the flash memory 122 (S311). The lens controller 120 transmits the read-out lens data to the camera controller 153 (S312).

Herein, the lens data includes information about characteristic values specific to the electromotive interchangeable lens 101, such as a lens name, an F number, a zoom controllable range, a focus controllable range and information about the operation members. Further, the lens data includes information about presence/absence of electrically driving zoom, and information about the zoom operation mode at a time of the electrically driving zoom operation. The information about presence/absence of the electrically driving zoom is not information indicating whether the zoom lens 112 is driven mechanically in conjunction with a user's operation in the interchangeable lens, but information indicating whether the zoom lens 112 is driven electrically by the zoom lens driver 113. The information about the zoom operation mode includes information about support for the step zoom operation mode. The camera controller 153 refers to the information about presence/absence of the electrically driving zoom and the information about the zoom operation mode obtained from the lens controller 120, to be capable of grasping whether the mounted interchangeable lens 101 can electrically drive the zoom lens, whether the mounted interchangeable lens 101 supports the step zoom operation mode, and the like. When the camera body 102 supports the electrically driving zoom, the camera controller 153 can perform various controls relating to the electrically driving zoom. Further, when the camera body 102 supports the zoom operation mode of the electromotive interchangeable lens 101, the camera controller 153 can perform controls according to the zoom operation mode.

Particularly, during the initial operation, the lens controller 120 reads out one or more positions (focal lengths) at each of which the zoom lens 112 can stop in the step zoom operation mode from the flash memory 122, and put the one or more positions into the lens data to transmit the lens data to the camera controller 153. Consequently, the camera controller 153 refers to the lens data to be capable of setting scales on the displays 300 and 310 of the zoom focal length information shown in FIGS. 5B and 5C that are displayed on the liquid crystal monitor 163.

In the above manner, the camera controller 153 completes the obtaining of the lens data about the mounted electromotive interchangeable lens 101 (S313). When the camera controller 153 recognizes that the mounted lens supports the electrically driving zoom and the step zoom operation mode from the obtained lens data, the camera controller 153 reads out the zoom operation mode that is stored in the flash memory 156 and is previously set by the user who uses the digital camera 100 (S314) to notify the electromotive interchangeable lens 101 of the read setting of the zoom operation mode (S315). FIG. 6 illustrates an example of the notification of the normal zoom operation mode (previously set mode). When receiving the setting notification of the zoom operation mode from the camera body 102, the electromotive interchangeable lens 101 changes into the zoom operation mode according to the instruction (S316). The example of FIG. 6 illustrates a case of the change into the normal zoom operation mode.

When the camera body 102 grasps the lens data about the electromotive interchangeable lens 101 mounted to the camera body 102 (S313), and when the setting of the zoom operation mode of the electromotive interchangeable lens 101 is completed (S316), the camera body 102 becomes in a capturing possible state.

In this state, the camera controller 153 requests lens state data indicating the state of the electromotive interchangeable lens 101 from the lens controller 120 (S317). The lens state data includes, for example, zoom focal length information by the zoom lens 112 (zoom magnification information), position information about the focus lens 110, aperture value information about the diaphragm 116, ring operation information about the operation to the operation ring 115, and so on. In response to this request, the lens controller 120 transmits the requested lens state data to the camera controller 153 (S318). When the operation ring 115 is operated, the ring operation information includes information indicating that the operation ring 115 is operated. When the operation ring 115 is not operated, the ring operation information includes information indicating that the operation ring 115 is not operated.

As described above, the camera body 102 and the electromotive interchangeable lens 101 request and respond about necessary data, and then the camera body 102 and the electromotive interchangeable lens 101 end the initial operation. Note that the lens state data is periodically requested from the camera body 102 to the electromotive interchangeable lens 101 even after the initial operation.

2-3. Control in Normal Zoom Operation Mode

Zoom control performed at a time when the electromotive interchangeable lens 101 is set to the normal zoom operation mode will be described.

FIG. 7 is a diagram describing the zoom operation sequence in the normal zoom operation mode. When the user of the digital camera 100 operates the operation ring 115 of the electromotive interchangeable lens 101 (S401), the lens controller 120 sends back the lens state data including the ring operation information indicating that the operation ring 115 is operated in response to the request (S402) of the lens state data periodically made by the camera controller 153 (S403). The lens state data includes the zoom focal length information about the current focal length of the zoom lens 112.

When the camera controller 153 recognizes that the operation ring 115 is operated based on the ring operation information, the camera controller 153 displays the display 300 of the zoom focal length information on the liquid crystal monitor 163 as shown in FIG. 5B based on the zoom focal length information included in the lens state data (S404). With the display 300 of the zoom focal length information, the user can grasp the focal length determined by the position of the zoom lens 112. Note that instead of the focal length, the position of the zoom lens 112 may be displayed, or that the variable magnification determined by the focal length may be displayed.

Further, when the operation ring 115 is operated, the lens controller 120 transmits a control signal to the zoom lens driver 113 to drive the zoom lens 112 (S405). Even while the user is operating the operation ring 115 (S406), the camera controller 153 periodically requests the lens state data, and the lens controller 120 transmits the lens state data (S407). At this time, since the zoom lens 112 is being driven, the zoom focal length information included in the lens state data is updated. When receiving the response of the lens state data, the camera controller 153 updates the display 300 of the zoom focal length information on the liquid crystal monitor 163 based on the updated zoom focal length information (S408).

In such a manner, the request of the lens state data (S406), the response about the lens state data (S407), and the updating of the zoom focal length information display (S408) are repeated while the zoom lens 112 is being driven. As a result, the user of the digital camera 100 can grasp a driving state of the zoom lens 112 on the liquid crystal monitor 163.

When the variable magnification of the electromotive interchangeable lens 101 reaches variable magnification intended by the user, the user ends the operation to the operation ring 115 (S411). When detecting the end of the operation to the operation ring 115, the lens controller 120 immediately provides a stop instruction to the zoom lens driver 113 to stop the driving of the zoom lens 112 (S412).

In response to the request of the lens state data (S413) periodically made by the camera controller 153, the lens controller 120 transmits the lens state data including the zoom focal length information corresponding to the position at which the zoom lens 112 finally stops and the ring operation information indicating that the operation to the operation ring 115 is ended (S414).

When receiving the lens state data from the lens controller 120, the camera controller 153 updates the display 300 of the zoom focal length information on the liquid crystal monitor 163 (S415). The user checks the updated display 300 of the zoom focal length information to be capable of grasping the final stop position of the zoom lens 112. When a predetermined time elapses from displaying of the updated zoom focal length information 300 (S416), the camera controller 153 returns the display on the liquid crystal monitor 163 from the display state including the display 300 of the zoom focal length information shown in FIG. 5B to the normal display state shown in FIG. 5A (S417).

2-4. Control in Step Zoom Operation Mode

Zoom control performed when the electromotive interchangeable lens 101 is set to the step zoom operation mode will be described.

Figure 8:
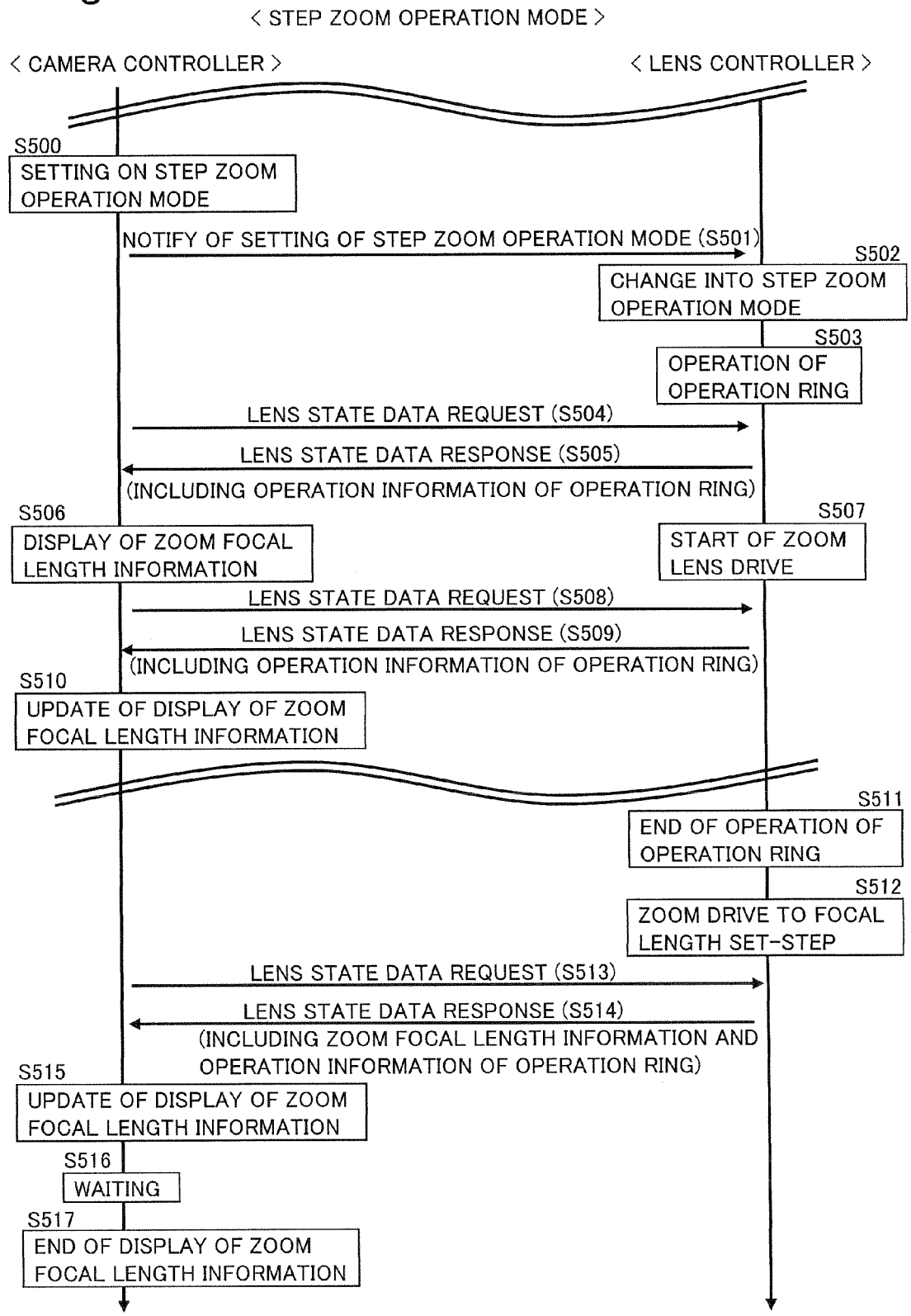
FIG. 8 is a flowchart illustrating the zoom operation of the digital camera in a step zoom operation mode according to the first embodiment of the present invention.

FIG. 8 is a diagram illustrating a zoom operation sequence in the step zoom operation mode.

When the user of the digital camera 100 selects the step zoom operation mode in menu setting of the camera body 102 or the like (S500), the camera controller 153 notifies the electromotive interchangeable lens 101 of the setting of the step zoom operation mode (S501). When receiving the setting notification of the step zoom operation mode from the camera controller 153, the electromotive interchangeable lens 101 changes into the step zoom operation mode (S502).

When the user of the digital camera 100 operates the operation ring 115 of the electromotive interchangeable lens 101 (S503), in response to the request (S504) of the lens state data periodically made by the camera controller 153, the lens controller 120 sends back the lens state data including the ring operation information indicating that the operation ring 115 is operated (S505). The lens state data includes the zoom focal length information about the current focal length of the zoom lens 112.

When recognizing that the operation ring 115 is operated by means of the ring operation information, the camera controller 153 displays the display 310 of the zoom focal length information for the step zoom operation mode on the liquid crystal monitor 163 as shown in FIG. 5C based on the zoom focal length information included in the lens state data (S506). With the display 310 of the zoom focal length information, the user can grasp the current zoom focal length information about the zoom lens 112 and a stoppable position (scale position) in the step zoom operation.

Then, the lens controller 120 transmits a control signal to the zoom lens driver 113 according to the operation to the operation ring 115 to drive the zoom lens 112 (S507). The camera controller 153 periodically requests the lens state data even while the operation ring 115 is being operated (S508). The lens controller 120 responds to the periodic request of the lens state data to transmit the lens state data (S509). At this time, since the zoom lens 112 is driven, the zoom focal length information included in the lens state data is being updated. When receiving the response of the lens state data, the camera controller 153 updates the display 310 of the zoom focal length information on the liquid crystal monitor 163 based on the updated zoom focal length information (S510).

When the variable magnification about the electromotive interchangeable lens 101 reaches the variable magnification intended by the user, the user ends the operation to the operation ring 115 (S511). When detecting the end of the operation to the operation ring 115, the lens controller 120 calculates a stop position at which the zoom lens 112 can be stopped next in the current advancing direction of the zoom lens 112 from the position information about the zoom lens 112 at the detection of the end of the operation, to drive the zoom lens 112 to the calculated stop position (S512).

The lens controller 120 transmits, in response to the periodic request of the lens state data (S513) from the camera controller 153, the lens state data including the zoom focal length information corresponding to the final stop position of the zoom lens 112 and the ring operation information indicating the end of the operation to the operation ring 115 (S514).

When receiving the response of the lens state data from the lens controller 120, the camera controller 153 updates the display 310 of the zoom focal length information on the liquid crystal monitor 163 (S515). The user checks the updated display 310 of the zoom focal length information to be capable of grasping the final stop position of the zoom lens 112. When a predetermined time elapses from the updating of the display 310 of the zoom focal length information (S516), the camera controller 153 returns the display on the liquid crystal monitor 163 from the display state including the display 310 of the zoom focal length information shown in FIG. 5C to the normal display state show in FIG. 5A (S517).

2-5. Switching From Step Zoom Operation Mode into Normal Zoom Operation Mode

Control performed when the zoom operation mode of the electromotive interchangeable lens 101 is changed from the step zoom operation mode into the normal zoom operation mode will be described.

FIG. 9 is a diagram describing a sequence performed when the zoom operation mode is switched from the step zoom operation mode into the normal zoom operation mode. When the user of the digital camera 100 turns off the step zoom operation mode on the menu setting of the camera body 102 or the like (S600), the camera controller 153 notifies the electromotive interchangeable lens 101 of the setting deactivation of the step zoom operation mode (S601). When receiving the notification of the setting deactivation of the step zoom operation mode from the camera controller 153, the lens controller 120 switches the zoom operation mode into the normal zoom operation mode (S602).

3. Conclusion

The interchangeable lens 101 of the digital camera 100 according to the first embodiment includes the zoom lens 112, the zoom lens driver 113 configured to drive the zoom lens, the operation ring 115 configured to receive the user's operation for changing the magnification of the zoom lens 112, and the lens controller 120 configured to control the zoom lens driver 113 according to the operation to the operation ring 115. The lens controller 120 controls the zoom lens driver 113 in either one of the normal zoom operation modes of the normal zoom operation mode (the first operation mode) that enables the zoom lens 112 to stop at an arbitrary position according to the operation to the operation ring 115 and the step zoom operation mode (the second operation mode) that enables the zoom lens 112 to stop at one of predetermined discrete stop positions according to the operation to the operation ring 115.

The step zoom operation mode enables the zoom lens to quickly and accurately stop at a predetermined intended position based on the stop position of the operation ring 115. For this reason, the setting of zoom magnification is enabled with good usability for the user.

Other Embodiments

The present invention is not limited to the above embodiment, and various embodiments are considered. Other embodiments of the present invention will be described below.

In the above first embodiment, the information about the group of positions at each of which the zoom lens 112 can stop in the step zoom operation mode is preliminarily stored in the flash memory 122 of the electromotive interchangeable lens 101. However, the information about the group of stoppable positions in the step zoom operation mode may preliminarily be stored in the flash memory 156 of the camera body 102 according to types of the electromotive interchangeable lens 101. In this case, the camera controller 153 obtains the stoppable position corresponding to the mounted interchangeable lens out of the stored group of stop positions in the initial operation according to, for example, the lens data (lens name or the like) obtained in steps S312 and S313, to transmit the information about the obtained stoppable position to the electromotive interchangeable lens 101. Further, when changing into the step zoom operation mode, the camera controller 153 may notify the electromotive interchangeable lens 101 of the information about the group of the stop positions at each of which the zoom lens 112 can be stopped.

In the step zoom operation mode, the position at which the zoom lens 112 is stopped may be set by the user on menu setting of the camera body 102 (for example, the menu screen displayed on the liquid crystal monitor 163). In this case, while the electromotive interchangeable lens 101 preliminarily retains the information about the group of the positions at each of which the zoom lens 112 can stop in the flash memory 122, when the initial operation (for example, S311 and 312) is performed or when the user selects the stop position, the lens controller 120 notifies the camera controller 153 of the group of the positions at each of which the zoom lens 112 can stop. Then, the user selects one or more positions in the step zoom operation mode out of the notified group of the stop positions. The camera controller 153 notifies the lens controller 120 of the stop position selected by the user.

Further, when the camera body 102 preliminarily stores the group of the positions stoppable in the step zoom operation mode in the flash memory 156, the user may select one or more stop positions in the step zoom operation mode out of the group of the stop positions stored in the flash memory 156 of the camera body 102. The camera controller 153 notifies the lens controller 120 of the stop position selected by the user.

In the above embodiment, after actually stopping the zoom lens 112 (S512), in response to the request of the lens state data from the camera controller 153, the lens controller 120 transmits the information about the position at which the zoom lens 112 actually stops to the camera controller 153 of the camera body 102 (S514). However, the following composition may be provided. When detecting the end of the operation to the operation ring 115 (step S511), the lens controller 120 calculates the position at which the zoom lens 112 can be stopped next in the current advancing direction of the zoom lens 112 from the position information about the zoom lens 112 at the time of detecting the end of the operation. At this time, before the zoom lens 112 actually stops, the information about the calculated stop position may be transmitted to the camera controller 153. As a result, before the zoom lens 112 actually stops, the camera controller 153 can recognize the position at which the zoom lens 112 is scheduled to stop, and the scheduled position is subject to displaying on the liquid crystal monitor 163 or the like to be capable of being notified to the user.

Further, normally, when the lens controller 120 detects the end of the operation to the operation ring 115 (S511), it is preferred to calculate a stop position that is the closest to the current position of the zoom lens 112 and at which the zoom lens 112 can be stopped next in the current advancing direction of the zoom lens 112 based on the position information about the zoom lens 112 at the time of detecting the end of the operation. However, the stop at the closest stop position is occasionally impossible due to any reason. In such a case, the lens controller 120 may notify the camera controller 153 of information indicating that the stop at the closest stop position is disabled in response to the lens state data. Further, together with this information, the actually stoppable position may be notified as a scheduled position.

In the above embodiment, in the step zoom operation mode, the lens controller 120 performs a control to cause the zoom lens 112 to stop only at the preset stop position. However, when the zoom lens 112 cannot be stopped at the preset stop position due to any reason and is stopped at the another position, the lens controller 120 may notify the camera controller 153 of information indicating that the stopping at the preset stop position is disabled. Note that, also in this case, the lens controller 120 may transmit the information about the position at which the zoom lens 112 actually stops to the camera controller 153 of the camera body 102 in response to the request of the lens state data from the camera controller 153.

The ideas disclosed in each of the above first embodiment and other embodiments can arbitrarily be combined by those skilled in the art.

The above embodiment illustrates the digital camera 100 as one example of the imaging apparatus, but the idea of the present invention is not limited to the application to the digital camera. The idea of the present invention can be applied to imaging apparatus such as a movie camera and a mobile telephone with cameras and an interchangeable lens-type imaging apparatus to which the interchangeable lens having the zoom function can be mounted.

INDUSTRIAL APPLICABILITY

The present invention can be applied to the imaging apparatus such as a digital camera, a movie camera and a mobile telephone with a camera and the interchangeable lens-type to which the interchangeable lens having the zoom function can be mounted.

DESCRIPTION OF REFERENCE SIGNS

100 Digital camera
101 Electromotive interchangeable lens
102 Camera body
110 Focus lens
111 Focus lens driver
112 Zoom lens
113 Zoom lens driver
115 Operation ring
116 Diaphragm
117 Diaphragm driver
120 Lens controller
121 DRAM (lens side)
122 Flash memory (lens side)
130 Lens mount
140 Body mount
150 CMOS image sensor
151 TG
152 AFE
153 Camera controller
154 Power supply
155 DRAM (body side)
156 Flash memory (body side)
160 Release button
162 Touch panel
163 Liquid crystal monitor
164 Memory card
165 Card slot
170 Camera side operation unit
204 Center button
205 Cross button

The invention claimed is:

1. An interchangeable lens mountable to a camera body, comprising:
a zoom lens; a driver configured to drive the zoom lens;
an operation unit configured to receive a user's operation for changing a magnification of the zoom lens;
a storage unit configured to store information about discrete predetermined stop positions;
a communication unit configured to transmit the information about the discrete predetermined stop positions stored in the storage unit to the camera body; and
a controller configured to control the driver according to the operation of the operation unit, wherein
the controller controls the driver in either one of a first operation mode for enabling the zoom lens to stop at an arbitrary position according to the operation of the operation unit and a second operation mode for enabling the zoom lens to stop at one of discrete predetermined stop positions according to the operation to the operation unit and the controller stops the zoom lens at one of discrete predetermined stop positions when a stop position of the zoom lens determined according to the operation received by the operation unit is different from one of discrete predetermined stop positions in the second operation mode.

2. The interchangeable lens according to claim 1, wherein the controller sets the operation mode to the first operation mode or the second operation mode according to an instruction from the camera body.

3. The interchangeable lens according to claim 1, further comprising a communication unit configured to transmit information about a position at which the zoom lens actually stops to the camera body.

4. The interchangeable lens according to claim 3, wherein when the controller cannot actually stop the zoom lens at the discrete predetermined stop position in the second operation mode, the controller transmits the information indicating that the zoom lens cannot stop at the discrete predetermined stop position to the camera body.

5. The interchangeable lens according to claim 3, wherein when the controller cannot stop the zoom lens at the discrete predetermined stop position in the second operation mode, the controller transmits information about the actual stop position of the zoom lens to the camera body.

6. The interchangeable lens according to claim 1, further comprising a communication unit configured to receive information about the discrete predetermined stop position from the camera body.

7. A digital camera comprising:
a camera body;
an interchangeable lens configured to be mountable to the camera body, the interchangeable lens including:
a zoom lens;
a driver configured to drive the zoom lens;
an operation unit configured to receive a user's operation for changing a magnification of the zoom lens; and
a lens controller configured to control the driver according to the operation of the operation unit, wherein:
the lens controller controls the driver in either one of a first operation mode for enabling the zoom lens to stop at an arbitrary position according to the operation of the operation unit and a second operation mode for enabling the zoom lens to stop at one of discrete predetermined stop positions according to the operation to the operation unit, and
the lens controller stops the zoom lens at one of discrete predetermined stop positions when a stop position of the zoom lens determined according to the operation received by the operation unit is different from one of discrete predetermined stop positions in the second operation mode;

the camera body including:
a storage unit configured to store information about the discrete predetermined stop positions regarding the interchangeable lens;
a camera controller configured to obtain characteristic information about the interchangeable lens from the mounted interchangeable lens and obtain information about the discrete predetermined stop position regarding the mounted interchangeable lens out of the information stored in the storage unit based on the obtained characteristic information; and
a communication unit configured to transmit the obtained information about the discrete predetermined stop position to the interchangeable lens.

* * * * *